US009653852B2

(12) United States Patent
Smentek et al.

(10) Patent No.: US 9,653,852 B2
(45) Date of Patent: May 16, 2017

(54) RF-ISOLATING SEALING ENCLOSURE AND INTERCONNECTION JUNCTIONS PROTECTED THEREBY

(71) Applicant: CommScope Technologies LLC, Hickory, NC (US)

(72) Inventors: David J. Smentek, Lockport, IL (US); Michael Guerin, St. Charles, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/697,255

(22) Filed: Apr. 27, 2015

(65) Prior Publication Data

US 2015/0333452 A1  Nov. 19, 2015

Related U.S. Application Data

(60) Provisional application No. 61/993,116, filed on May 14, 2014.

(51) Int. Cl.
| | | |
|---|---|---|
| H01R 13/52 | (2006.01) | |
| H01R 13/6599 | (2011.01) | |
| H01R 13/6592 | (2011.01) | |
| H01R 9/05 | (2006.01) | |
| H01F 38/14 | (2006.01) | |
| H02G 15/18 | (2006.01) | |
| H02G 15/08 | (2006.01) | |

(52) U.S. Cl.
CPC ......... *H01R 13/6599* (2013.01); *H01F 38/14* (2013.01); *H01R 9/05* (2013.01); *H01R 13/6592* (2013.01); *H01F 2038/146* (2013.01); *H02G 15/085* (2013.01); *H02G 15/18* (2013.01)

(58) Field of Classification Search
CPC ........ H01R 24/38; H01R 9/05; H01R 13/516; H01R 13/5213; H01R 13/5205; H01R 13/6392; H01R 13/6599; H01R 13/6592; H02G 1/14; H02G 15/18
USPC ........... 439/578, 275, 367, 369, 607.57, 368
See application file for complete search history.

(56) References Cited

U.S. PATENT DOCUMENTS

| | | | | |
|---|---|---|---|---|
| 5,562,497 | A * | 10/1996 | Yagi ................... | H01R 13/516 439/607.47 |
| 5,631,443 | A * | 5/1997 | Scrimpshire ......... | G02B 6/3887 174/359 |
| 5,886,294 | A * | 3/1999 | Scrimpshire ......... | G02B 6/3887 174/359 |
| 5,957,712 | A | 9/1999 | Stepniak | |
| 6,007,378 | A * | 12/1999 | Oeth .................. | H01R 13/5213 439/279 |
| 6,429,373 | B1 | 8/2002 | Scrimpshire et al. | |
| 6,672,902 | B2 * | 1/2004 | Skinner .............. | H01R 13/6598 174/378 |

(Continued)

OTHER PUBLICATIONS

International Search Report and Written Opinion for corresponding PCT Application No. PCT/IB2015/053393, date of mailing Aug. 13, 2015, 12 pages.

*Primary Examiner* — Hae Moon Hyeon
(74) *Attorney, Agent, or Firm* — Myers Bigel, P.A.

(57) ABSTRACT

An interconnection junction for communications cables includes: a first connector; a second connector; and a sealing enclosure having a cavity and formed of a polymeric material, the sealing enclosure comprising an RF-isolating material. The first connector and second connector are joined and reside within the cavity of the sealing enclosure.

15 Claims, 3 Drawing Sheets

(56) References Cited

U.S. PATENT DOCUMENTS

| | | | |
|---|---|---|---|
| 7,566,831 B2* | 7/2009 | Holland | H01R 13/5219 |
| | | | 174/74 R |
| 8,702,440 B2* | 4/2014 | Nooner | H01R 13/5213 |
| | | | 439/279 |
| 8,801,460 B2* | 8/2014 | Van Swearingen | H01Q 1/00 |
| | | | 439/578 |
| 2001/0009823 A1 | 7/2001 | Suzuki | |
| 2002/0046849 A1* | 4/2002 | Rapp | H05K 9/0015 |
| | | | 29/603.27 |
| 2008/0200053 A1 | 8/2008 | Hughes et al. | |
| 2014/0004726 A1 | 1/2014 | Cartier, Jr. et al. | |
| 2014/0097022 A1 | 4/2014 | Vaccaro | |
| 2014/0134878 A1* | 5/2014 | Van Swearingen | H01Q 1/00 |
| | | | 439/607.01 |
| 2015/0017827 A1 | 1/2015 | Vaccaro | |
| 2015/0064946 A1* | 3/2015 | Darrow | H01T 4/04 |
| | | | 439/183 |
| 2015/0118898 A1* | 4/2015 | Paynter | H01R 9/0503 |
| | | | 333/24 C |
| 2016/0020534 A1* | 1/2016 | Paynter | H02G 1/14 |
| | | | 439/578 |

* cited by examiner

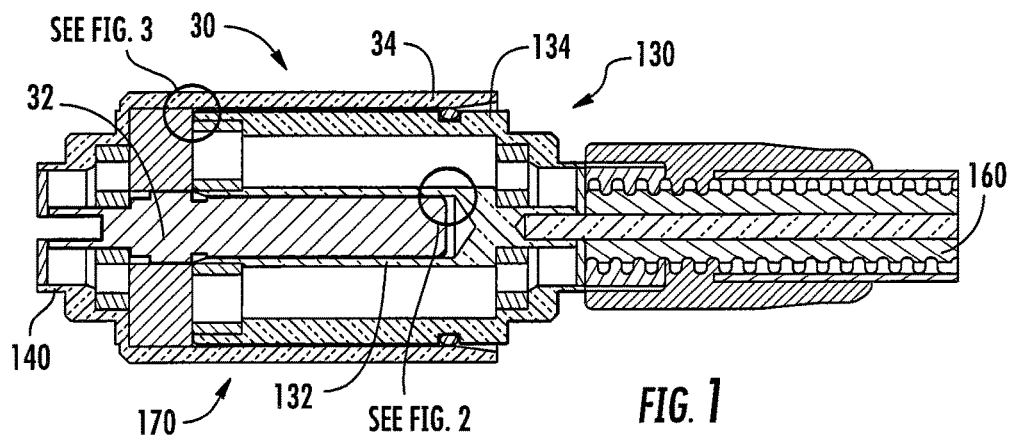
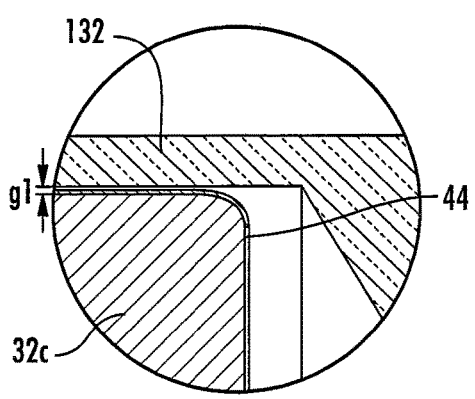
FIG. 2
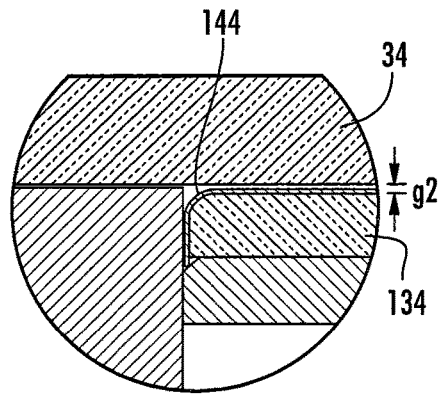
FIG. 3
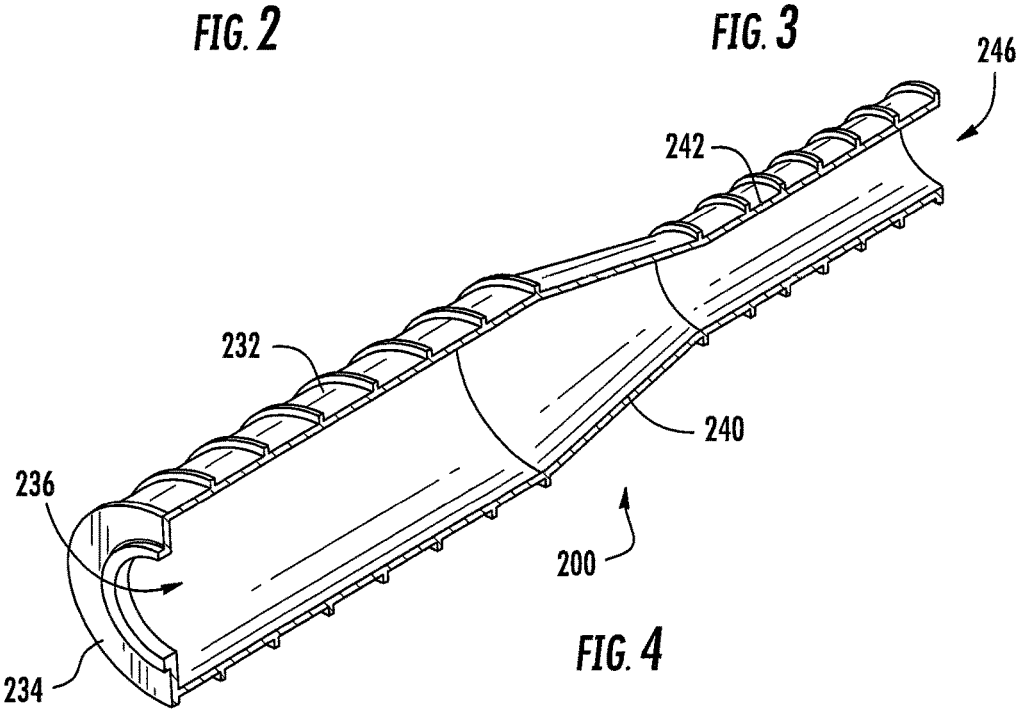
FIG. 4

RF-ISOLATING SEALING ENCLOSURE AND INTERCONNECTION JUNCTIONS PROTECTED THEREBY

RELATED APPLICATION

The present application claims the benefit of and priority from U.S. Provisional Patent Application No. 61/993,116, filed May 14, 2014, the disclosure of which is hereby incorporated herein in its entirety.

FIELD OF THE INVENTION

The invention relates generally to a device for environmentally sealing and securing the interconnection between electrical cables and/or electrical cables and electronic equipment.

BACKGROUND

Interconnection junctions, such as the interconnection between two cables or a cable and a piece of electronic equipment, may be subject to mechanical degradation from environmental factors such as moisture, vibration and repeated expansion and contraction from daily temperature changes. Outer sealing enclosures that surround or enclose an electrical interconnection have been used to protect such interconnections. Enclosures often apply rigid clamshell configurations that, once closed, may be difficult to open, especially when installed in exposed or remote locations, such as atop radio towers; gaskets or gel seals may be applied at the enclosure ends and/or along a sealing perimeter of the shell.

Elastic interconnection seals are also known. Elastic seals can be advantageous by virtue of being more easily installed over the typically uneven contours of an electrical interconnection. Exemplary configurations are described in U.S. Pat. No. 6,429,373 and in U.S. patent application Ser. No. 13/646,952, filed Oct. 8, 2012; Ser. No. 13/938,475, filed Jul. 10, 2013; and Ser. No. 14/245,443, filed Apr. 4, 2014, the disclosures of each of which are hereby incorporated by reference herein.

The development of additional configurations and varieties of connectors can necessitate additional sealing configurations and techniques.

SUMMARY

As a first aspect, embodiments of the invention are directed to an interconnection junction, comprising: a first connector; a second connector; and a sealing enclosure having a cavity and formed of a polymeric material, the sealing enclosure comprising an RF-isolating material. The first connector and second connector are joined and reside within the cavity of the sealing enclosure.

As a second aspect, embodiments of the invention are directed to a sealing enclosure for an interconnection junction of connectors, comprising a body portion having a cavity therein, the cavity configured to house an interconnection junction of a first connector and a second connector. The body portion is formed of a polymeric material that comprises an RF-isolating material.

BRIEF DESCRIPTION OF THE FIGURES

FIG. 1 is a partial cross-section of the coaxial cable-connector assembly according to embodiments of the invention, the assembly being shown in a mated condition.

FIG. 2 is an enlarged partial section view of the coaxial cable-connector assembly of FIG. 1.

FIG. 3 is an enlarged partial section view of the coaxial cable-connector assembly of FIG. 1.

FIG. 4 is a perspective section view of a cover boot to be used in conjunction with the coaxial cable-connector assembly of FIG. 1 according to embodiments of the invention.

DETAILED DESCRIPTION

Figure 5:
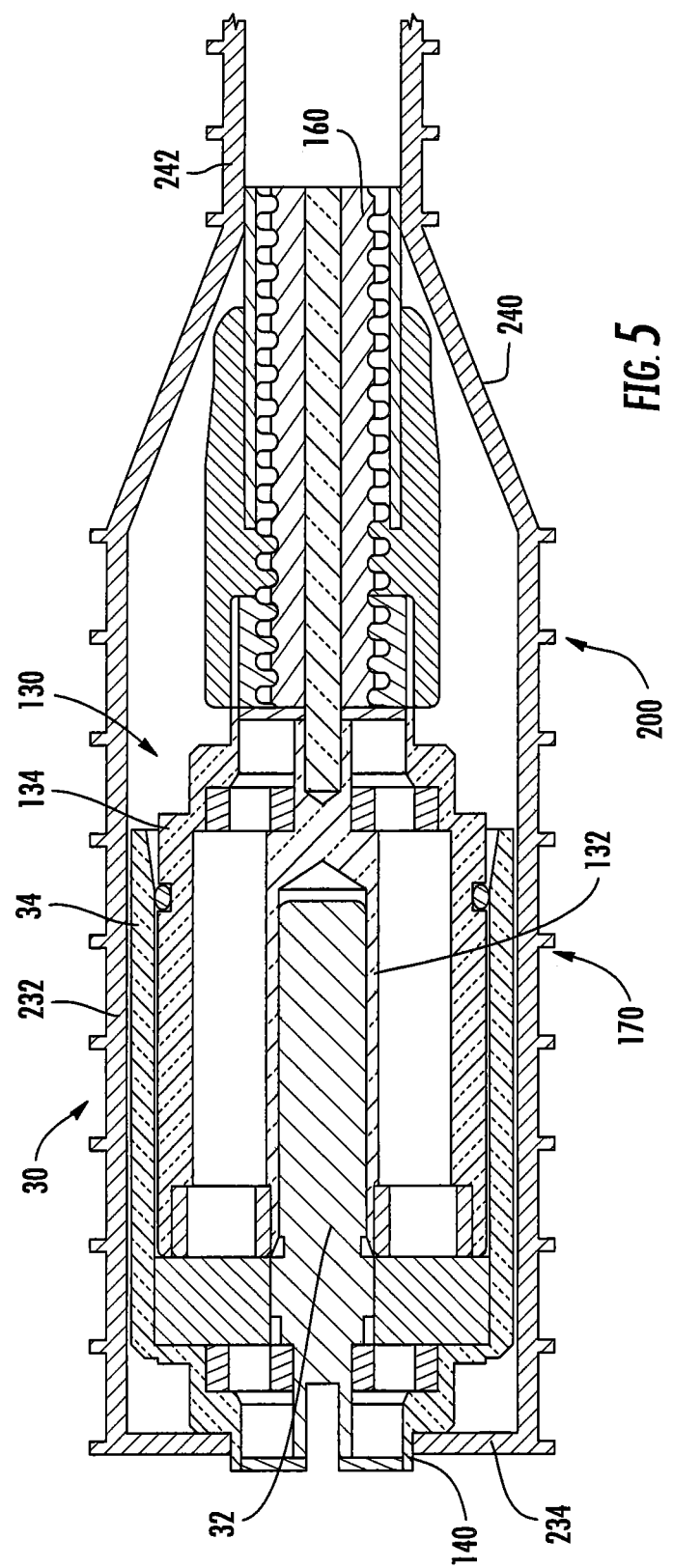
FIG. 5 is a section view of the cover boot and coaxial cable-connector assembly of FIG. 4.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used herein is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Traditionally, coaxial electrical connectors relied on direct galvanic contact between the respective inner conductors and the respective outer conductors of the connectors to conduct power, signals, etc. However, recently some electrical connectors have been designed that rely on capacitive coupling of conductors rather than direct galvanic connection. Capacitive coupling can assist in reducing and/or eliminating Passive Intermodulation (PIM), the presence of which can negatively impact the performance of joined connectors. Exemplary capacitively coupled connectors are discussed in U.S. patent application Ser. No. 14/102,042, filed Dec. 10, 2013, the disclosure of which is hereby incorporated herein in its entirety.

Although their use can be beneficial, capacitively coupled connectors may be subject to additional influences that are less prevalent with traditional galvanic connections. The inventors have recognized that some capacitively coupled connectors may be susceptible to interference from external radio frequency signals. This may be particularly true for connectors that rely on a gap (either filled with a dielectric material, filled with air, or a combination of dielectric and air) between the outer conductors of the two connectors.

An exemplary interface of connectors is illustrated in FIG. 1. A jack 130, mounted to a jumper cable 160, is inserted into a plug 30 that is mounted via a stem 140 on a structure such as a remote radio head, antenna or the like. The plug 30 includes an outer conductor extension 34 that mates with an outer conductor extension 134 of the jack 130, and an inner conductor extension 32 that mates with an inner conductor extension 132 of the jack 130. Together, the plug 30 and jack 130 form an interconnection 170.

As can be seen in FIG. 3, a gap g2 is present between the outer conductor extension 34 and the outer conductor extension 134; similarly, and as shown in FIG. 2, a gap g1 is present between the inner conductor extension 32 and the inner conductor extension 132. The gap g2, which may include a dielectric layer 144 or may be filled with air, creates a capacitive element between the outer conductor extension 34 and the outer conductor extension 134, and the gap g1, which may include a dielectric layer 44, creates a capacitive element between the inner conductor extension 32 and the inner conductor extension 132. However, the presence of the gaps g1, g2 also reduces the ability of the interface to provide RF shielding.

The inventors have recognized that a sealing enclosure, such as the cover boot described in U.S. Pat. No. 6,429,373 and the two-piece boot and cover described in U.S. patent application Ser. No. 14/245,443, supra, can provide RF shielding of either a capacitively coupled interface or a traditional galvanic interface. Thus, pursuant to embodiments of the invention, sealing enclosures that include an RF-isolating material (such as an RF-absorbent material or an RF-reflective material) are discussed below.

In one embodiment, the sealing enclosure may be formed of a conductive polymer. As used herein, a "polymeric" material includes elastomeric materials, such as rubbers, as well as harder polymeric materials. The conductivity of the polymeric material may provide shielding of RF signals. Exemplary conductive elastomeric materials may include silicone, fluorosilicone, ethylene propylene diene monomer (EPDM), and nitrile rubbers filled with silver-plated aluminum, nickel-plated graphite, and silver-plated copper. Other exemplary polymeric materials include acrylonitrile-butadiene-styrene (ABS) and polypropylene.

As an alternative, the sealing enclosure may be formed of a material that has been impregnated or doped with an RF-isolating material. Exemplary RF-absorbing materials include silver-plated aluminum, nickel-plated graphite, silver-plated copper, and ferrite- or iron-based alloys.

As another alternative, the sealing enclosure may be formed of a material that has been coated with an RF-isolating material. Exemplary coating materials include conductive paints (typically infused with copper, aluminum and/or silver) or a thin film/sheets of an RF-absorbing material. This embodiment may be particularly suitable for clamshell-style sealing enclosures.

In embodiments of sealing enclosures in which interconnection junctions of capacitively coupled connectors are housed, care should be taken so that no more than one DC conductive path exists between either of the outer conductors of the connectors and the RF-absorbent material of the sealing enclosure. Put differently, either one or the other of the outer conductors may contact the RF-isolating material of the sealing enclosure, but not both: otherwise, a DC connection will be present between the outer conductors of the two connectors, thus destroying the capacitive coupling between the conductors and the benefits conveyed thereby.

Referring now to FIG. 4, a cover boot for an interconnection junction of coaxial connectors, designated broadly at 200, is illustrated therein. The cover boot 200 includes a generally cylindrical interconnection section 232. An end wall 234 with an opening 236 partially covers one end of the interconnection section 232. A tapered transition section 240 merges with the interconnection section 232; in turn, a generally cylindrical cable section 242 merges with the transition section 240. Thus, the hollow, generally coaxial sections of the cover boot 200 define a continuous bore 246.

As can be seen in FIG. 5, the cover boot 200 can then be applied such that the interconnection section 232 of the cover boot 200 fits over the interconnection 170, with the end wall 234 positioned adjacent the end of the plug 30 adjacent the mounting structure and the stem 140 snugly held within the opening 236. The cable section 242 fits over the jumper cable 160. Because the interconnection 170 resides within the cover boot 200, with the opening 236 fitting tightly over the stem 140 and the cable section 242 fitting tightly over the cable 160, a seal is formed over the interconnection 170 that can help to protect it from moisture and other environmental agents.

Because the interconnection 170 is a capacitively coupled interconnection, care should be taken to avoid making direct contact between any conductive portions of the cover boot 200 and both of the outer conductor extensions 34, 134. One manner of achieving this configuration would be to coat the outer surface of the cover boot 200 with an RF-isolating coating, such that the coating is shielded from the outer conductor extensions 34, 134 by the remainder of the cover boot 200 and, therefore, contacts neither of the outer conductor extensions 34, 134. In another embodiment, the cover boot 200 may include a coating band, strip or ring on its inner surface that contacts only the outer conductor 34 of the plug 30 near or at its free end and is spaced apart from the outer conductor 134 of the jack 130. As another alternative, the cover boot 200 may be formed of a conductive elastomer and shaped such that the interconnection section 232 and transition section 240 are spaced from the outer conductor 134 of the jack 130, so as to avoid contact therewith. As still another alternative, an adapter for the sealing enclosure, such as that discussed in U.S. Provisional Patent Application No. 61/908,977, filed Nov. 26, 2013, the disclosure of which is hereby incorporated herein in its entirety, may be employed to space the cover boot 200 away from one of the outer conductor extensions. Other alternatives will be apparent to those of skill in this art.

Figure 7:
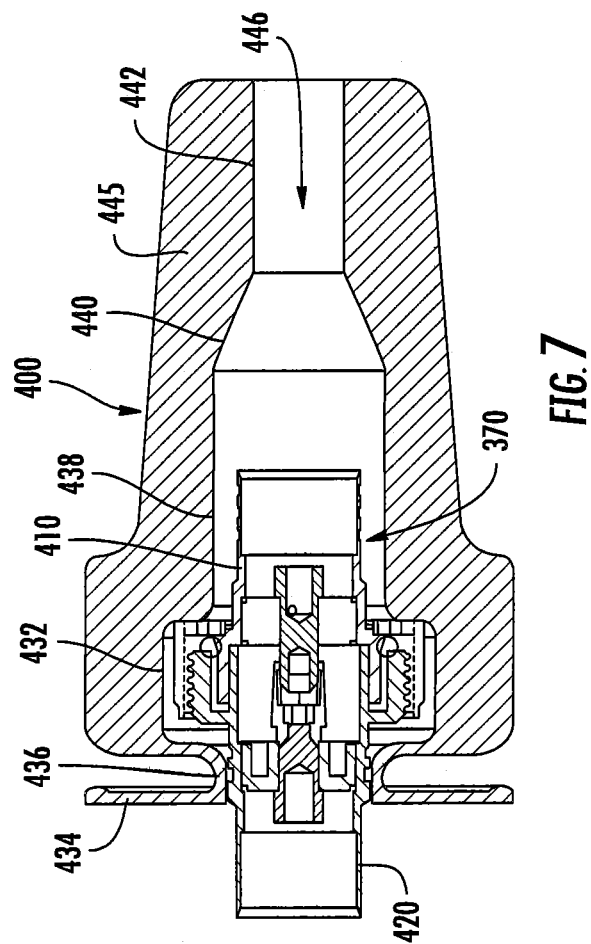
FIG. 7 is a section view of the cover boot of FIG. 6 and an alternative coaxial cable-connector assembly.
Figure 6:
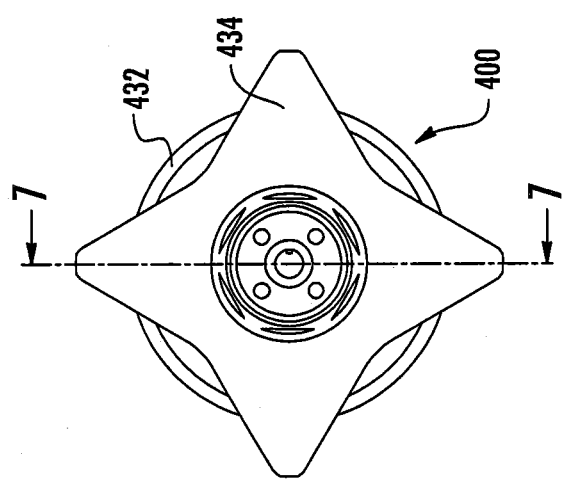
FIG. 6 is an end view of a cover boot according to additional embodiments of the invention.

Referring now to FIGS. 6 and 7, a galvanic connector interface, designated broadly at 370, is shown therein. The interface 370 includes a connector 410 configured to be attached to the end of a coaxial cable and a connector 420 configured to be mounted on a piece of electronic equipment, such as a remote radio head. The interface 370 is enclosed within a sealing cover 400 that includes a generally cylindrical interconnection section 432. A diamond-shaped flange 434 is mounted to the interconnection section 432 via a short trunk 436. A generally cylindrical main section 438 merges with the interconnection section 432 opposite the trunk 436. The main section 438 is smaller in diameter than the interconnection section 432. A tapered transition section 440 merges with the main section 438; in turn, a generally cylindrical cable section 442 merges with the transition section 440. The cover 400 also includes two opposed axially-extending fins 445 that project radially outwardly and three axial ribs between the fins 445 on each side. Thus, the hollow, generally coaxial sections of the cover 400 define a continuous bore 446. The cover 400 is described in greater detail in U.S. patent application Ser. No. 14/245,443, filed Apr. 4, 2014, supra. The cover 400 may be formed of any of the materials discussed above and/or be rendered RF-isolating in any of the ways discussed above.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An interconnection junction, comprising:
 a first connector;
 a second connector;
 a sealing enclosure having a cavity and formed of a polymeric material, the sealing enclosure comprising an RF-isolating material;
 wherein the first connector and second connector are joined and reside within the cavity of the sealing enclosure;
 wherein the first connector includes a first central conductor and a first outer conductor, and the second connector includes a second central conductor and a second outer conductor, and wherein when the first and second connectors are engaged, a capacitive element is present between the first outer conductor and the second outer conductor.

2. The interconnection junction defined in claim 1, wherein the polymeric material of the sealing enclosure comprises a rubber material selected from the group consisting of silicone, fluorosilicone, EPDM, and nitrile.

3. The interconnection junction defined in claim 1, wherein the RF-isolating material of the sealing enclosure comprises a material selected from the group consisting of silver-plated aluminum, nickel-plated graphite, silver-plated copper, and ferrite- or iron-based alloys.

4. The interconnection junction defined in claim 1, wherein the RF-isolating material comprises a coating on a surface of the sealing enclosure.

5. The interconnection junction defined in claim 1, wherein the RF-isolating material comprises a filler in the polymeric material.

6. The interconnection junction defined in claim 1, wherein the RF-isolating material is impregnated into the polymeric material.

7. The interconnection junction defined in claim 1, wherein the capacitive element comprises air.

8. The interconnection junction defined in claim 1, further comprising a first cable attached to the first connector at one end.

9. A sealing enclosure for an interconnection junction of connectors, comprising:
 a body portion having a cavity therein, the cavity configured to house an interconnection junction of a first connector and a second connector;
 wherein the body portion is formed of a polymeric material that comprises an RF-isolating material; and,
 further comprising first and second connectors engaged with each other and residing in the cavity, wherein the first connector includes a first central conductor and a first outer conductor, and the second connector includes a second central conductor and a second outer conductor, and wherein a capacitive element is present between the first outer conductor and the second outer conductor.

10. The sealing enclosure defined in claim 9, wherein the polymeric material of the sealing enclosure comprises a rubber material selected from the group consisting of silicone, fluorosilicone, EPDM, and nitrile.

11. The sealing enclosure defined in claim 9, wherein the RF-isolating material of the sealing enclosure comprises a material selected from the group consisting of silver-plated aluminum, nickel-plated graphite, silver-plated copper, and ferrite- or iron-based alloys.

12. The sealing enclosure defined in claim 9, wherein the RF-isolating material comprises a coating on a surface of the sealing enclosure.

13. The sealing enclosure defined in claim 9, wherein the RF-isolating material comprises a filler in the polymeric material.

14. The sealing enclosure defined in claim 9, wherein the RF-isolating material is impregnated into the polymeric material.

15. An interconnection junction, comprising:
 a first connector;
 a second connector;
 a sealing enclosure having a cavity and formed of a polymeric material, the sealing enclosure comprising an RF-isolating material;
 wherein the first connector and second connector are joined and reside within the cavity of the sealing enclosure;
 wherein the first connector includes a first central conductor and a first outer conductor, and the second connector includes a second central conductor and a second outer conductor, and wherein when the first and second connectors are engaged, a capacitive element is present between the first outer conductor and the second outer conductor; and
 wherein the sealing enclosure is configured such that the sealing enclosure contacts at most one of the first and second outer conductors.

* * * * *